United States Patent
Babineau

[11] Patent Number: 6,023,924
[45] Date of Patent: Feb. 15, 2000

[54] EASY GRIP TOOL

[76] Inventor: Mark Babineau, 425 Underwood St., Holliston, Mass. 01746

[21] Appl. No.: 09/056,004

[22] Filed: Apr. 6, 1998

[51] Int. Cl.⁷ .............................. A01D 7/00; A46B 5/02
[52] U.S. Cl. .................................. 56/400.01; 56/400.17; 56/DIG. 18; 15/143.1
[58] Field of Search ........................ 56/400.01, 400.05, 56/400.07, DIG. 18, 400.17, 400.18; 15/143.1

[56] References Cited

U.S. PATENT DOCUMENTS

| | | |
|---|---|---|
| 2,536,607 | 1/1951 | Jenkins . |
| 3,130,533 | 4/1964 | Huegel et al. . |
| 4,704,758 | 11/1987 | Hoffman ........................... 15/143.1 X |
| 4,791,780 | 12/1988 | Phillips . |
| 4,809,388 | 3/1989 | Dietrich ............................... 15/143.1 |
| 4,848,073 | 7/1989 | Germain et al. . |
| 4,985,961 | 1/1991 | Kegley . |
| 5,133,101 | 7/1992 | Hauser et al. ........................ 15/143.1 |
| 5,467,590 | 11/1995 | Mencarelli et al. ................. 56/400.17 |
| 5,528,792 | 6/1996 | Nazemi ............................. 15/143.1 X |

FOREIGN PATENT DOCUMENTS

2657 of 1854 United Kingdom .

Primary Examiner—H. Shackelford
Attorney, Agent, or Firm—Michael I. Kroll

[57] ABSTRACT

An easy grip tool (10) comprising a implement head (12). An elongated rigid handle (14) has upper and lower offset handgrips (16), (18) formed therein. A structure (20) is for attaching a bottom end of the elongated rigid handle (14) to a top end of the implement head (12) in a removable manner. The elongated rigid handle (14) can be adjusted to the implement head (12), so that a left handed and a right handed person (22) can grip the upper and lower offset handgrips (16), (18) to comfortably sweep the implement head (12) along the ground (24). In a second embodiment being an easy grip tool (10a), the elongated rigid handle (14) is substituted with an elongated rigid handle (14a) having a ninety degree offset portion (54) formed near a bottom end. The elongated rigid handle (14a) can be adjusted to the implement head (12), so that the left handed and a right handed person (22), can grip the elongated rigid handle (14a) to comfortably sweep the implement head (12) along the ground (24).

10 Claims, 7 Drawing Sheets

EASY GRIP TOOL

BACKGROUND OF THE INVENTION

1. Field of the Invention

The instant invention relates generally to rakes and more specifically it relates to an easy grip tool. The easy grip tool consists of an implement head and an elongated rigid handle having upper and lower offset handgrips formed therein, which can be adjusted to the implement head, so that left and right handed people can grip the upper and lower offset handgrips to comfortably sweep the implement head along the ground. The implement head will extend further away from the body of a person using the easy grip tool, making use thereof quicker and safer, since the implement head will not catch on shoe laces and pants legs.

When using the easy grip tool in a pulling motion towards the person, there is less fatigue in the arms and shoulders, while there is less tension on the wrists as they are not twisted. This also results in less callouses on the thumb knuckles.

2. Description of the Prior Art

Numerous rakes have been provided in prior art. For example, U.S. patents numbered U.S. Pat. No. 2,536,607 to Jenkins; U.S. Pat. No. 4,791,780 to Phillips; U.S. Pat. No. 4,848,073 to Germain et al. and U.S. Pat. No. 4,985,961 to Kegley all are illustrative of such prior art. While these units may be suitable for the particular purpose to which they address, they would not be as suitable for the purposes of the present invention as heretofore described.

JENKINS, HOMER T.

BROOM RAKE

U.S. Pat. No. 2,536,607

In a rake or the like adapted to be used with sweeping motion by reciprocating the same transversely forwardly of the person comprising telescopic handle means and sweeping means at one end of the handle means. The handle means and the sweeping means being arranged so that the handle means extends angularly upwardly and outwardly from the sweeping means toward the person. The longitudinal axis of the handle means lies within a plane defined by the sweeping means. Hand grip means at the other end of the handle means and in transverse disposition therewith prevents rotative movement of the latter about its axis when the rake is used with a sweeping motion.

PHILLIPS, DAVID X.

ROOF RAKE

U.S. Pat. No. 4,791,780

The rake of this invention has an "S" shaped angled handle allowing a person to rake in a forward sweeping motion. Two rows of teeth facing in an opposite direction from one another are necessary so one can use the raking device from the left or right on one's self.

GERMAIN, ROBERT A.

PORTZ, WILLIAM E.

LAWN RAKE

U.S. Pat. No. 4,848,073

A lawn rake includes a tine receiving rake head molded of a plastic material as an integral unit structure and includes a handle receiving portion and at least one tine mounting portion. The handle receiving portion includes a generally centrally located elongated socket portion for receiving therein one end of a handle. The socket portion includes a circumferential groove formed in the wall defining the socket. The groove has a solid wall portion and a slotted wall portion. A spring like member has a first end connected to the rake head adjacent the tine mounting portion and a second end terminating in partially annular portion. The partially annular portion is adapted to pass through the slotted portion of the groove to be seated within the solid wall portion thereof. A handle is inserted into the socket portion of the rake head for securing the partially annular portion of the spring in the groove.

KEGLEY, BOYD F.

HANDLE AND IMPLEMENT HEAD ASSEMBLY

U.S. Pat. No. 4,985,961

A handle and implement head assembly comprising an implement head having a working edge adjacent a substantially planar portion. The assembly further includes a pair of generally longitudinal gripping portions having parallel axes and a connection member that positions the pair of gripping portions on the same side of and substantially equidistant from a central plan which perpendicularly bisects the planar portion and passes through the center of the working edge. At least one of the gripping portions would be positioned outside the plane of the implement.

SUMMARY OF THE INVENTION

A primary object of the present invention is to provide an easy grip tool that will overcome the shortcomings of the prior art devices.

Another object is to provide an easy grip tool consisting of a implement head and an elongated rigid handle having upper and lower offset handgrips formed therein which can be adjusted to the implement head, so that left and right handed people can grip the upper and lower offset handgrips to comfortably sweep the implement head along the ground.

An additional object is to provide an easy grip tool in which the implement head will extend further away from the body of a person using the easy grip handle, making use thereof quicker and safer, since the implement head will not catch on shoe laces and pants legs.

An still additional object is to provide an easy grip tool, whereby when using the easy grip tool in a pulling motion towards the person, there will be less fatigue in the arms and shoulders, while there will be less tension on the wrists as they are not twisted, thereby this will also result in less callouses on the thumb knuckles.

A further object is to provide an easy grip tool that is simple and easy to use.

A still further object is to provide an easy grip tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Turning now descriptively to the drawings, in which similar reference characters denote similar elements throughout the several views, FIGS. 1 through 5 illustrate a first embodiment of the present invention being an easy grip tool 10. With regard to the reference numerals used, the following numbering is used throughout the various drawing figures.

10 easy grip tool—first embodiment
10a easy grip tool—second embodiment
12 implement head of 10 and 10a
14 elongated rigid handle of 10
14a elongated rigid handle of 10a
16 upper offset handgrip in 14
18 lower offset handgrip in 14
20 attaching structure of 10 and 10a
22 person
24 ground
25 rake head for 12
26 triangular shaped web of 25
28 tine of 25
30 rib of 25
32 C-shaped gripping member for 16 and 18
34 bottom horizontal segment of 32
36 vertical segment of 32
36a vertical support segment on 14
38 top horizontal segment of 32
40 hand of 22
42 socket member of 20
43 top opening in 42
44 internally threaded aperture in 42
46 setscrew of 20
48 molded plastic material for 14 and 14a
50 lightweight composite material for 14 and 14a
52 tubular steel material for 14 and 14a
54 ninety degree offset portion of 14a The easy grip tool 10 comprises an implement head 12. An elongated rigid handle 14 has upper and lower offset handgrips 16, 18 formed therein. A structure 20 is for attaching a bottom end of the elongated rigid handle 14 to a top end of the implement head 12 in a removable manner. The elongated rigid handle 14 can be adjusted to the implement head 12, so that a left handed and a right handle person 22 can grip the upper and lower offset handgrips 16, 18 to comfortably sweep the implement head 12 along the ground 24.

The implement head 12 is a rake head 25, which includes a triangular shaped web 26. A plurality of tines 28 are affixed to and radially extend downwards from a bottom edge of the triangular shaped web 26. A rib 30 is attached to and generally extends transversely across the middle of the tines 28.

Figure 1:
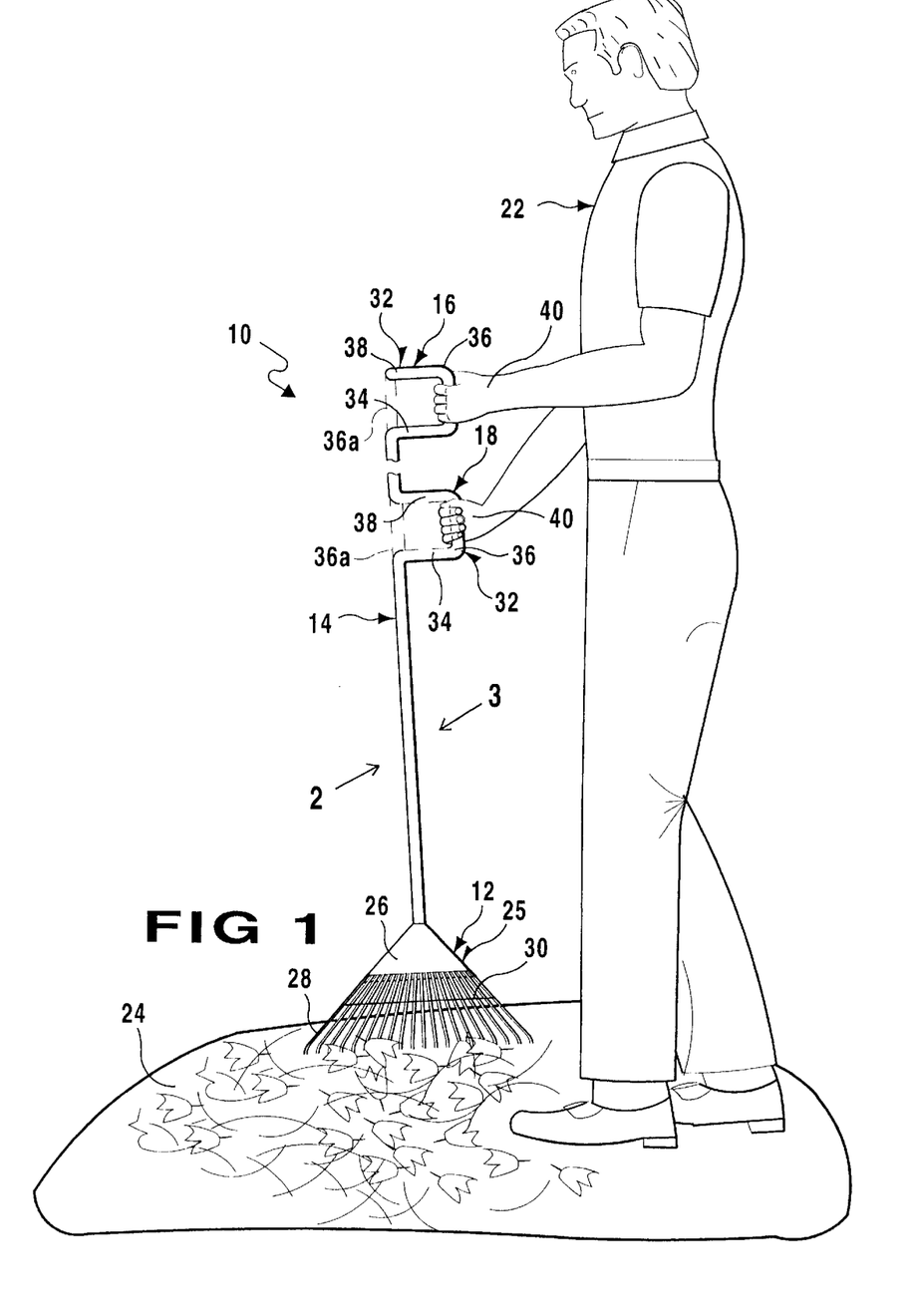
FIG. 1 is a front perspective view of a first embodiment of the present invention, showing part of the handle broken away with the vertical segments of the upper and lower offset handgrips of the handle being gripped by the hands of a person.
Figure 1A:
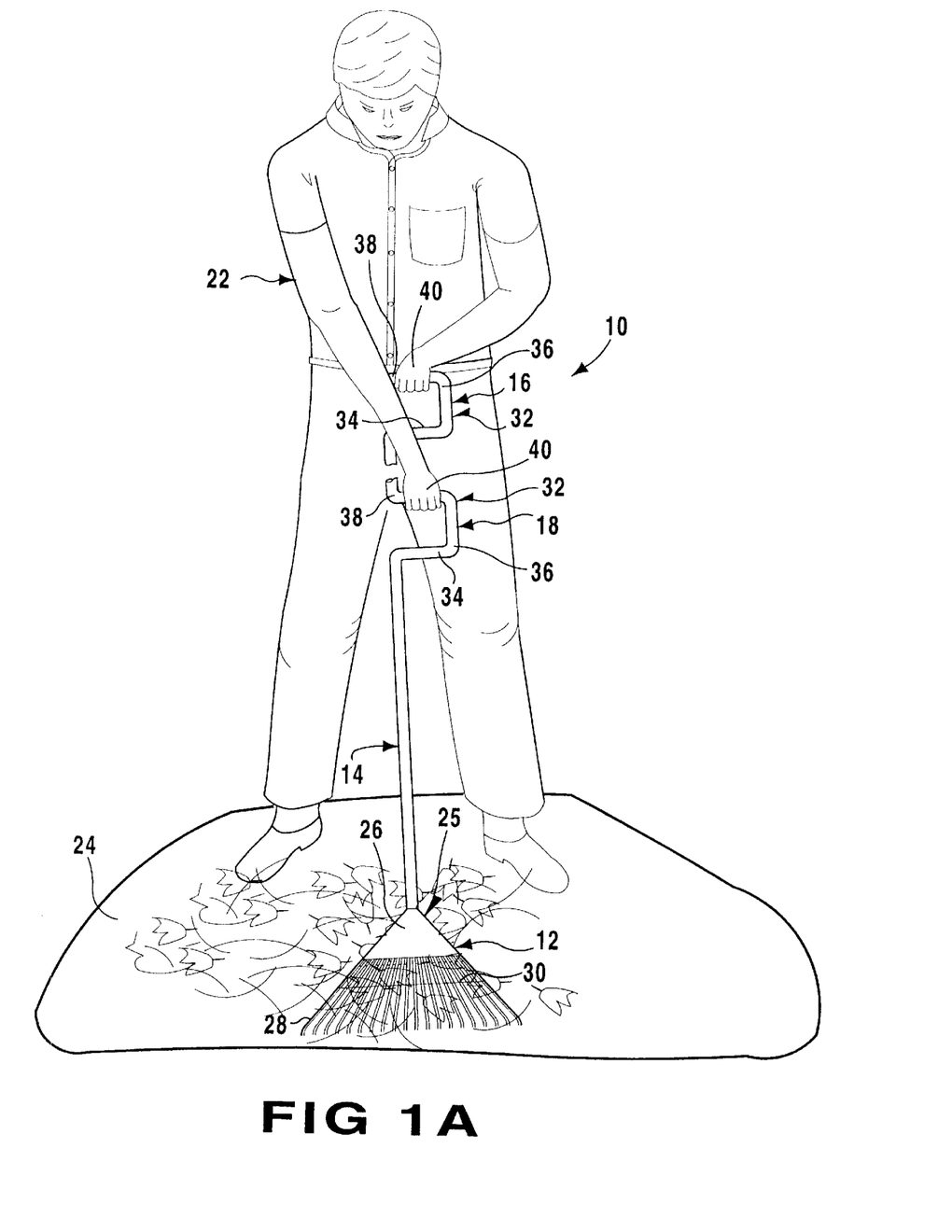
FIG. 1A is a front perspective view of the first embodiment, showing part of the handle broken away with the top horizontal segments of the upper and lower offset handgrips of the handle being gripped by the hands of the person.

Each upper and lower offset handgrip 16, 18 is bent into a generally C-shaped gripping member 32 in the elongated rigid handle 14. The C-shaped gripping member 32 consists of a bottom horizontal segment 34 extending away from the elongated rigid handle 14. A vertical segment 36 extends up from the lower horizontal segment 34. A top horizontal segment 38 extends between the vertical segment 36 and the elongated rigid handle 14 in a parallel relationship to the bottom horizontal segment 34. In a first instance, as shown in FIG. 1, hands 40 of the person 22 can grasp the vertical segment 36. In a second instance, as shown in FIG. 1A, the hands of the person 22 can grasp the top horizontal segments 38.

The attaching structure 20 comprises a socket member 42 affixed vertically to the top end of the implement head 25. The socket member 42 has a top opening 43 and an internally threaded aperture 44 extending transversely therethrough. A bottom end of the elongated rigid handle 14 can be inserted into the top opening 43 in the socket member 42. A setscrew 46 threads into the internally threaded aperture 44 in the socket member 42, to retain the bottom end of the elongated rigid handle 14. The elongated rigid handle 14 can be fabricated out of a molded plastic material 48, a lightweight composite material 50, or a tubular steel material 52.

Figure 6:
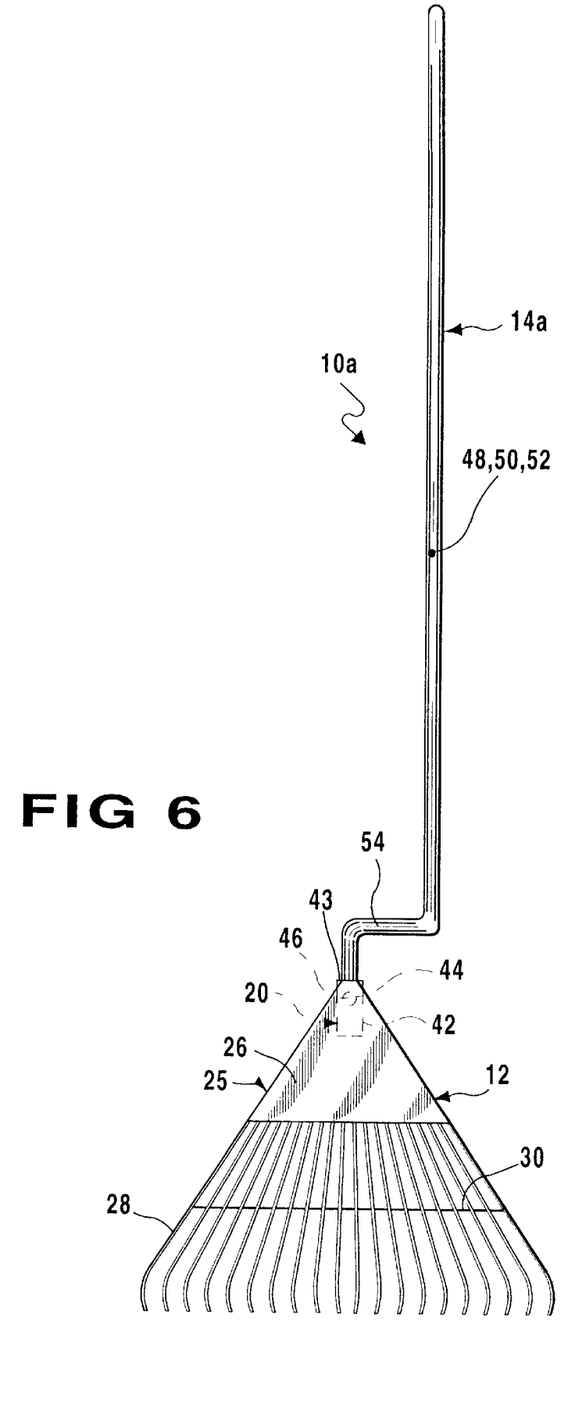
FIG. 6 is a front elevational view of a second embodiment of the present invention, showing the handle offset at a right angle on the bottom.

FIG. 6 shows a second embodiment of the easy grip tool 10a, comprising the implement head 12. An elongated rigid handle 14a has a ninety degree offset portion 54 formed near a bottom end. The structure 20 is for attaching the bottom end of the elongated rigid handle 14a to a top end of the implement head 12 in a removable manner. The elongated rigid handle 14a can be adjusted to the implement head 12, so that the left handed and the right handed person 22 can grip the elongated rigid handle 14a to comfortably sweep the implement head 12 along the ground 24.

The implement head 12 is the rake head 25, which includes the triangular shaped web 26. The plurality of tines 28 are affixed to and radially extend downwards from a bottom edge of the triangular shaped web 26. The rib 30 is attached to and generally extends transversely across the middle of the tines 28.

The attaching structure 20 comprises the socket member 42 affixed vertically to the top end of the implement head 25.

The socket member 42 has the top opening 43 and the internally threaded aperture 44 extending transversely therethrough. The bottom end of the elongated rigid handle 14a can be inserted into the top opening 43 in the socket member 42. The setscrew 46 threads into the internally threaded aperture 44 in the socket member 42, to retain the bottom end of the elongated rigid handle 14a. The elongated rigid handle 14a can also be fabricated out of the molded plastic material 48, the lightweight composite material 50, or the tubular steel material 52.

The implement head 12 in the drawings is shown as the rake head 25, for illustrative purposes only. The implement head 12 can also be a broom head, a snow shovel head, a rake head with short steel tines to be used for pulling gravel or other material and a hoe head.

Figure 2:
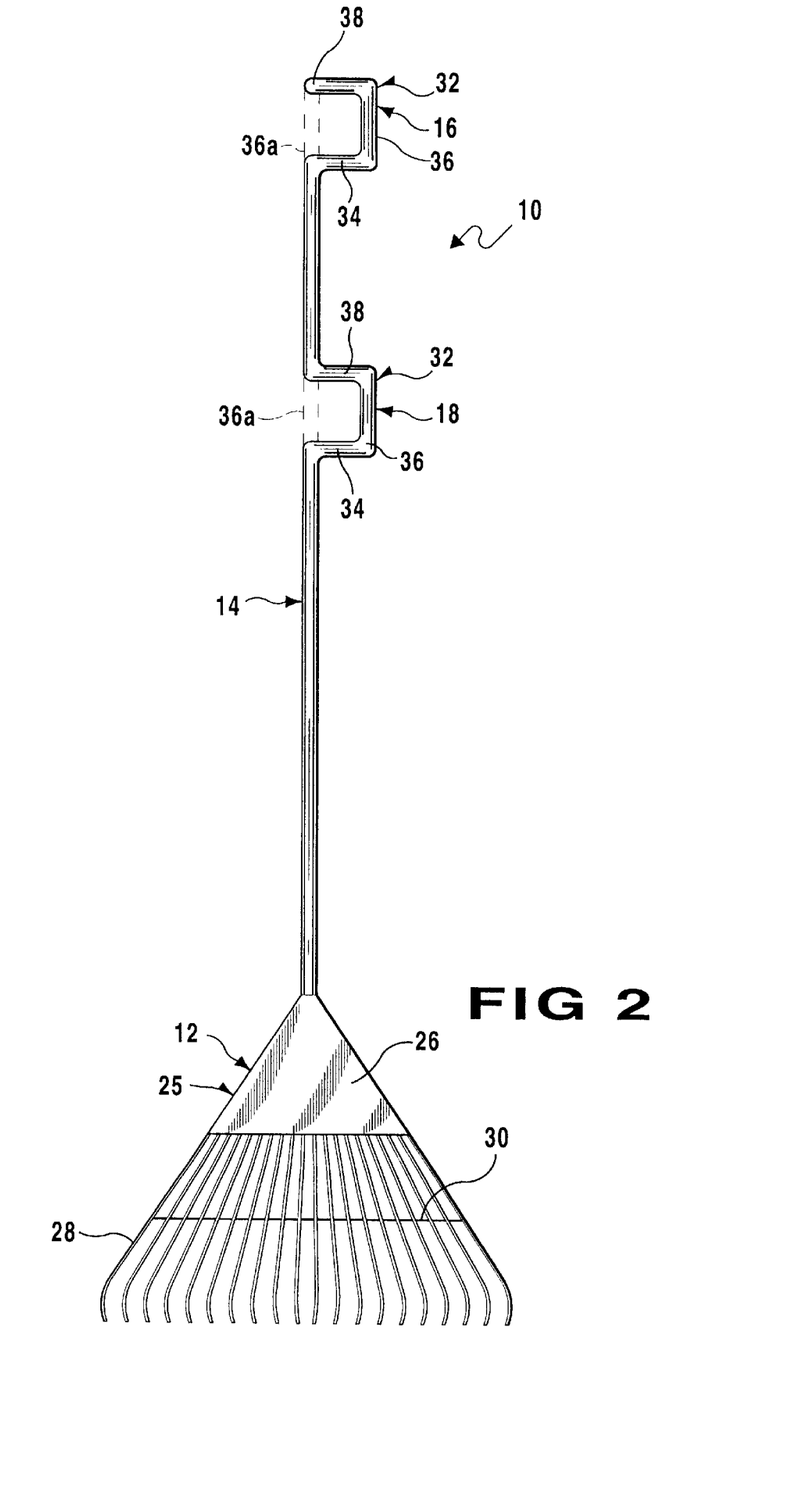
FIG. 2 is an enlarged front elevational view of the first embodiment per se, taken in the direction of arrow 2 in FIG. 1.
Figure 3:
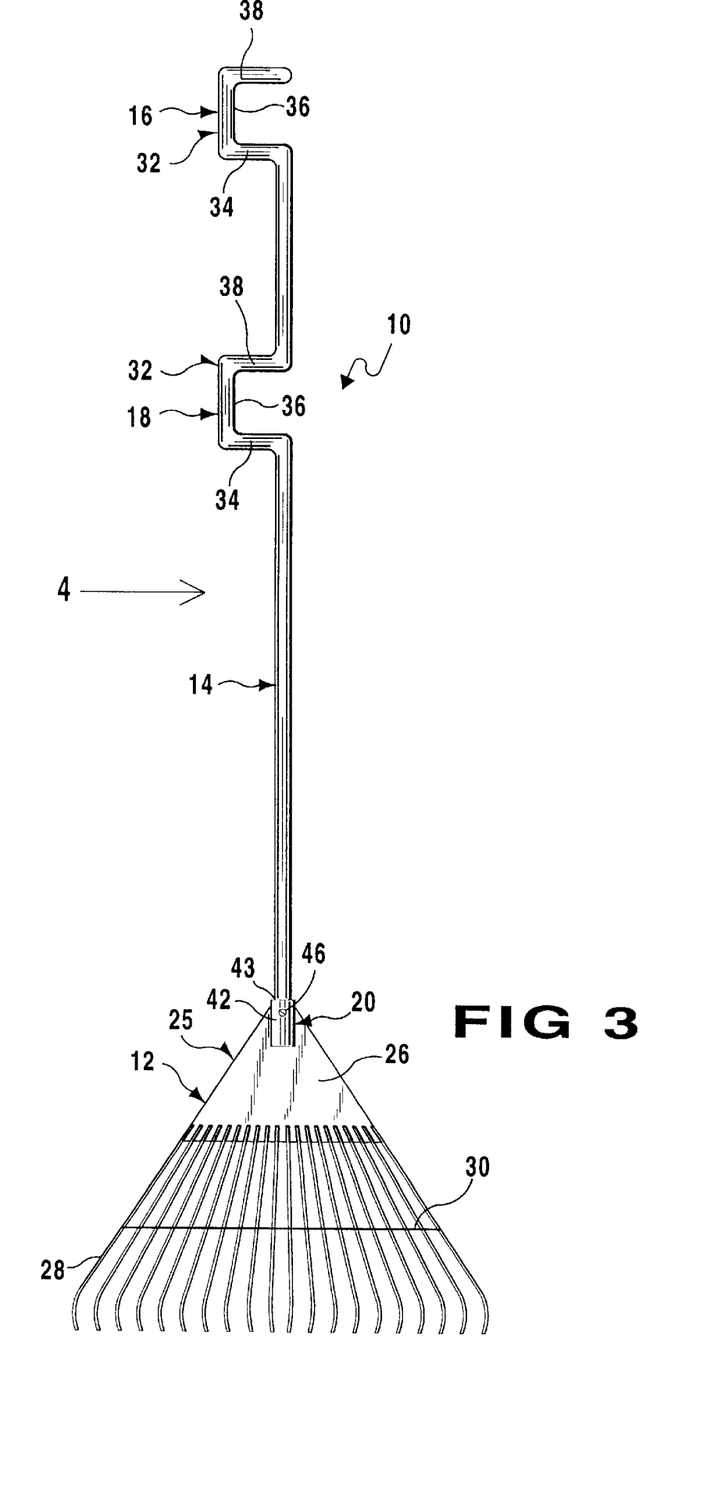
FIG. 3 is an enlarged rear elevational view of the first embodiment per se, taken in the direction of arrow 3 in FIG. 1.
Figure 4:
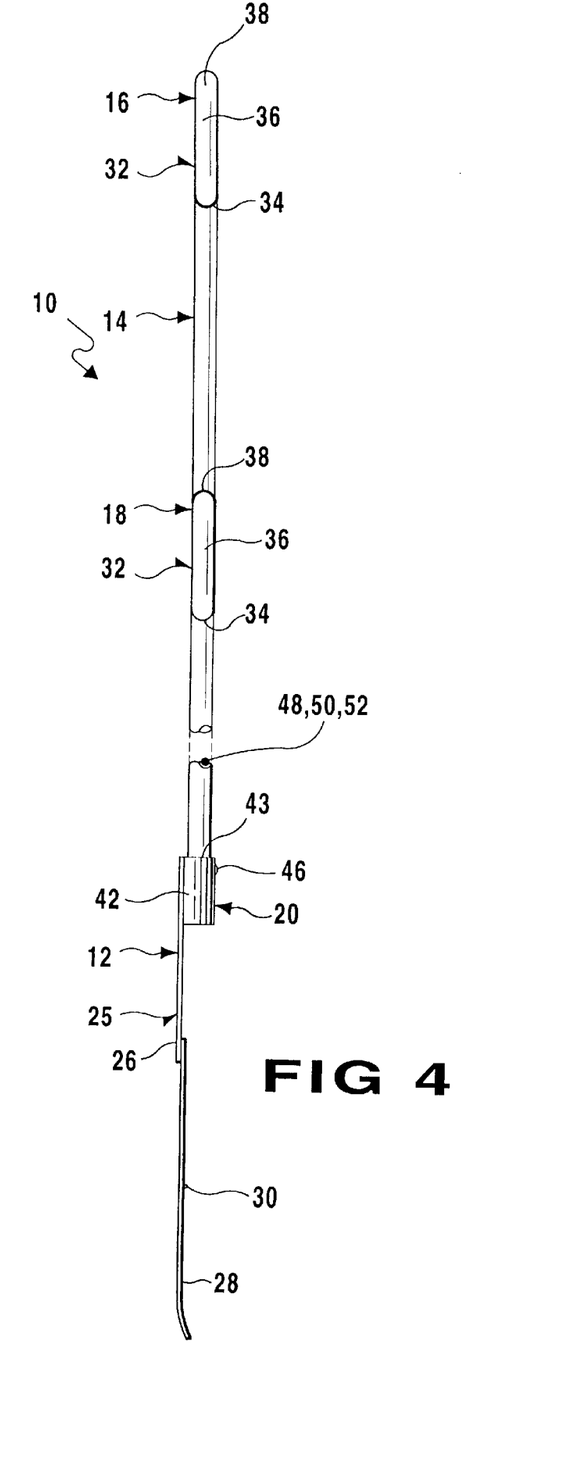
FIG. 4 is a side elevational view, taken in the direction of arrow 4 in FIG. 3, showing part of the handle broken away.
Figure 5:
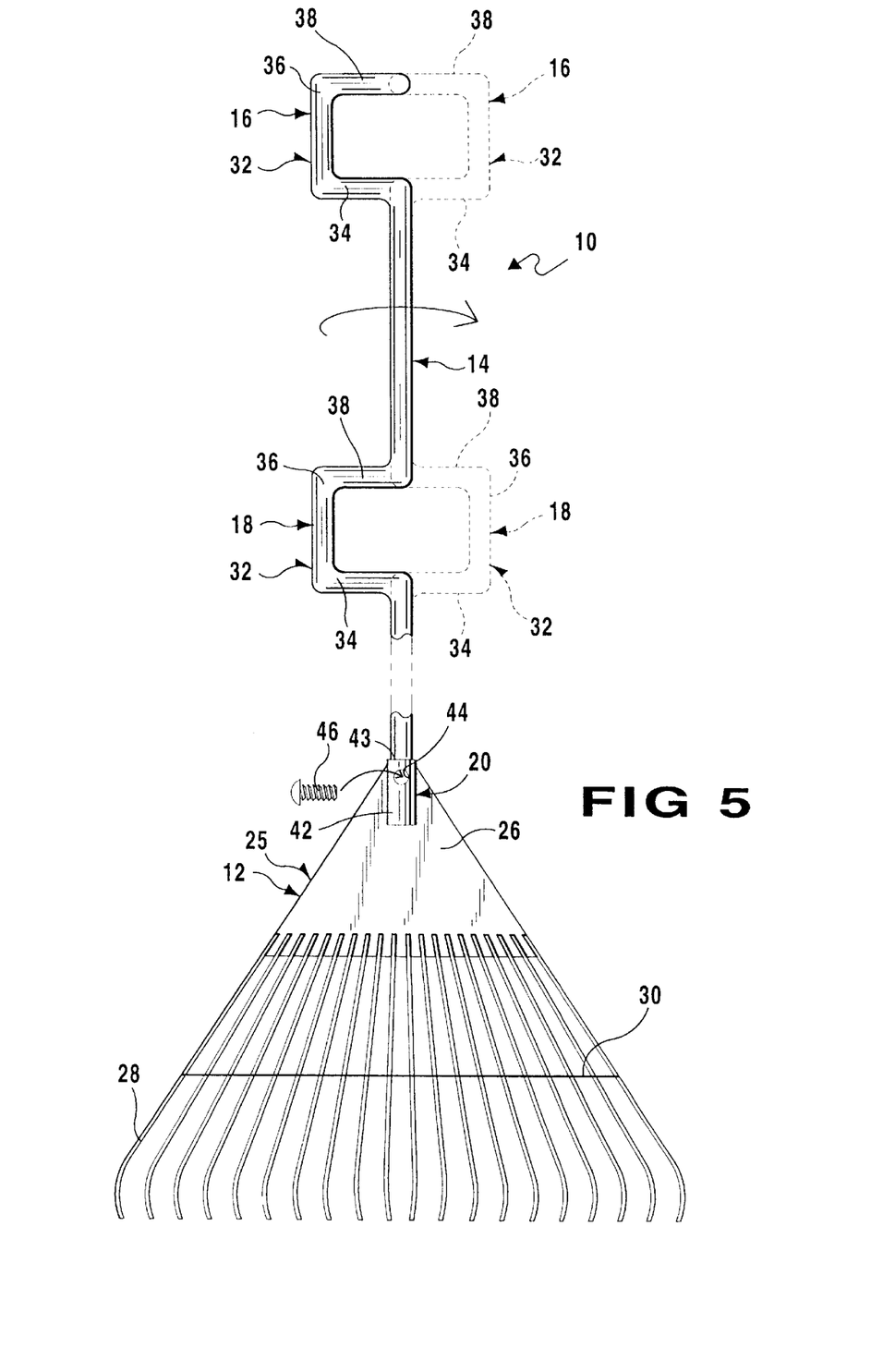
FIG. 5 is a further enlarged rear elevational view of the first embodiment showing part of the handle broken away, with the screw removed from the socket member, so that the handle can be turned and retained for left and right handed people.

The handle 14 in FIGS. 1 and 2, could also contain two vertical support segments 36a, shown in phantom. Each vertical support segment 36a extends between the lower horizontal segment 34 and the top horizontal segment 38, in a spaced away parallel relationship from the vertical segment 36 of one C-shaped gripping member 32. This will add strength to the handle 14 and prevent breakage when in use.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An easy grip tool comprising:
   a) an implement head;
   b) an elongated rigid handle having upper and lower offset handgrips formed therein; and
   c) means for attaching a bottom end of said elongated rigid handle to a top end of said implement head in a removable manner, in which said elongated rigid handle can be adjusted to said implement head, so that a left handed and a right handed person can grip said upper and lower offset handgrips to comfortably sweep said implement head along the ground, wherein each said upper and lower offset handgrip is bent into a generally C-shaped gripping member in said elongated rigid handle, said C-shaped gripping member including:
      i) a bottom horizontal segment extending away from said elongated rigid handle;
      ii) a vertical segment extending us from said lower horizontal segment; and
      iii) a top horizontal segment extending between said vertical segment and said elongated rigid handle in a parallel relationship to said bottom horizontal segment, so that in a first instance hands of the person can grasp said vertical segment, and in a second instance the hands of the person can grasp said top horizontal segments.

2. An easy grip tool as recited in claim 1, wherein said implement head is a rake head.

3. An easy grip tool as recited in claim 2, wherein said implement head includes:
   a) a triangular shaped web;
   b) a plurality of tines affixed to and radially extending downwards from a bottom edge of said triangular shaped web; and
   c) a rib attached to and generally extending transversely across the middle of said tines.

4. An easy grip tool as recited in claim 1, wherein said attaching means includes:
   a) a socket member affixed vertically to the top end of said implement head, said socket member having a top opening and an internally threaded aperture extending transversely therethrough, so that a bottom end of said elongated rigid handle can be inserted into said top opening in said socket member; and
   b) a setscrew which threads into said internally threaded aperture in said socket member to retain the bottom end of said elongated rigid handle.

5. An easy grip tool as recited in claim 1, wherein said elongated rigid handle is fabricated out of a molded plastic material.

6. An easy grip tool as recited in claim 1, wherein said elongated rigid handle is fabricated out of a lightweight composite material.

7. An easy grip tool as recited in claim 1, wherein said elongated rigid handle is fabricated out of a tubular steel material.

8. An easy grip tool as recited in claim 4, wherein said elongated rigid handle is fabricated out of a molded plastic material.

9. An easy grip tool as recited in claim 4, wherein said elongated rigid handle is fabricated out of a lightweight composite material.

10. An easy grip tool as recited in claim 4, wherein said elongated rigid handle is fabricated out of a tubular steel material.

* * * * *